Jan. 17, 1928. Re. 16,857

A. M. STRYKER

CANDY CONTAINING AND DISPLAYING DEVICE

Original Filed Aug. 3, 1923 2 Sheets-Sheet 1

Inventor:
Auriol M. Stryker,
By Cromwell, Greist & Warden
Attys

Jan. 17, 1928.

Re. 16,857

A. M. STRYKER

CANDY CONTAINING AND DISPLAYING DEVICE

Original Filed Aug. 3, 1923 2 Sheets-Sheet 2

Inventor:
Auriol M. Stryker

By Cromwell, Greist & Warden
Attys.

Reissued Jan. 17, 1928. Re. 16,857

UNITED STATES PATENT OFFICE.

AURIOL M. STRYKER, OF CHICAGO, ILLINOIS, ASSIGNOR TO E. J. BRACH & SONS, OF CHICAGO, ILLINOIS, A CORPORATION OF ILLINOIS.

CANDY CONTAINING AND DISPLAYING DEVICE.

Original No. 1,582,703, dated April 27, 1926, Serial No. 655,401, filed August 3, 1923. Application for reissue filed May 6, 1927. Serial No. 189,413.

My invention relates to a candy containing and displaying device, and has for an object to provide a series of separate units for displaying different candies, which units may be, if desired, inserted in contiguous relation within a show-case and individually removed and replaced without disturbing any of the other units or the candy therein.

Another object is to provide such a device which contains a space or chamber for permanent display and a space for storing candy which is being sold, and which may be withdrawn from said storage space without disturbing the display candy.

And another object is to provide such a device which will constantly give the impression that the box is completely filled, and that the candy is drawn from a substantially undiminished supply including that displayed.

Other objects will appear hereinafter.

The invention consists in the combinations and arrangements of parts hereinafter described and claimed.

The invention will be best understood by reference to the accompanying drawings forming a part of this specification, and in which—

Figure 1:
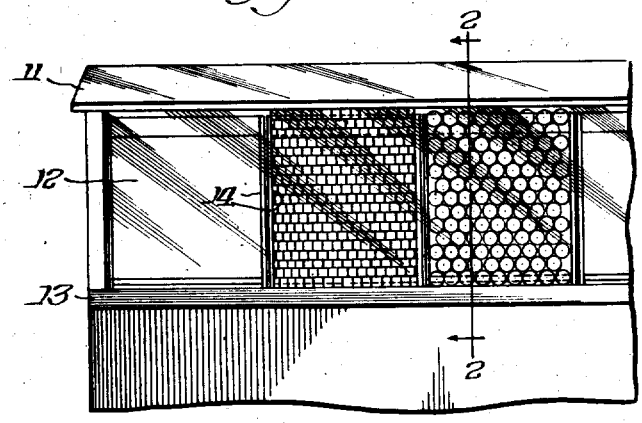
Fig. 1 is a partial elevation of a show-case partly broken away, with several of my units or combination devices placed therein.
Figure 2:
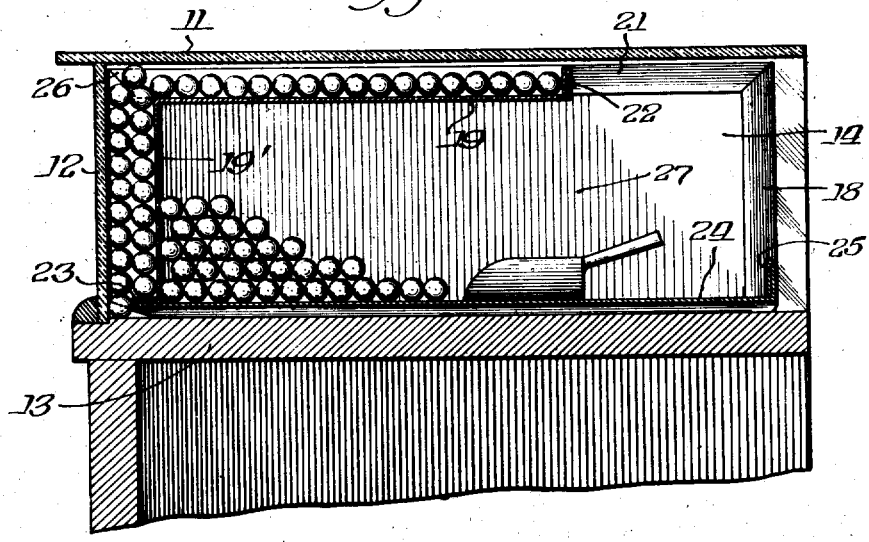
Fig. 2 is an enlarged section taken on line 2—2 of Fig. 1.
Figure 3:
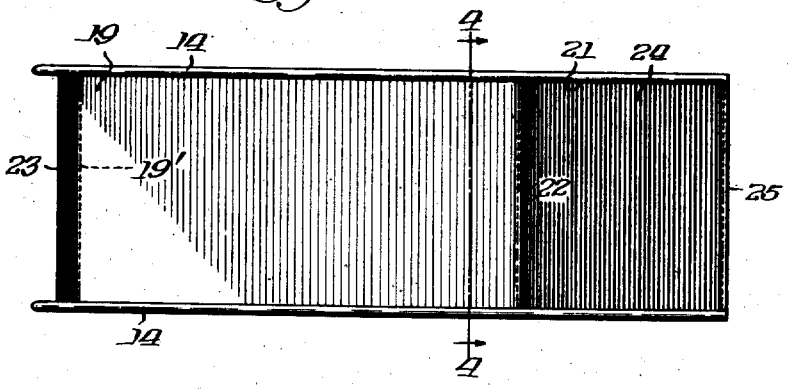
Fig. 3 is a top view of one unit or device.
Figure 4:
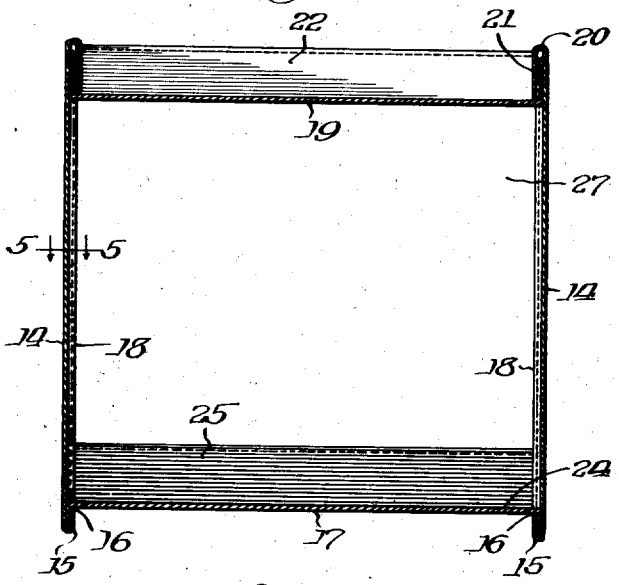
Fig. 4 is an enlarged vertical section taken on line 4—4 of Fig. 3.
Figure 5:
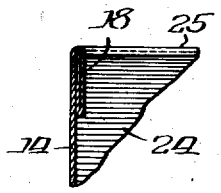
Fig. 5 is a detail horizontal section taken on line 5—5 of Fig. 4.

The particular form of my invention illustrated comprises a series of similar units or combinations containing and displaying devices which are mountable together in a show-case of the usual type having a top 11 and a front 12, both of glass, supported on the base 13 of said case, the units or devices being preferably made of sheet metal and of a shape and size to fit the construction of the particular show-case.

Each unit or device, as illustrated, comprises a pair of side walls or members 14 made of a size and shape substantially equal to the cross section of the show-case in which it is to be mounted. The lower edges of these side walls are bent inwardly forming flanges 15 for receiving the depending flanges 16 of the bottom 17 of said unit to support said bottom. The rear edges of the side members are preferably doubled over forming reenforcing flanges 18, as shown.

Partition means 19 is mounted between the side members 14, adjacent the outer edges of the top and front of the device and extends substantially parallel with said edges, being in the nature of a false bottom and backing member. Flanges 20 on the edges of means 19 are clamped under inwardly turned upper flanges 21 of side members 14 and fasten said means 19 in position. In the form illustrated, which is shown in connection with a square front show-case, this portion 19 comprises a main upper portion having a rear retaining flange 22 spaced forward from the rear end of walls 14, and a front portion 19′, the lower edge of which is fastened with a forwardly extending flange in the forward part 23 of bottom member 17, or in any suitable manner, said bottom member having an upturned retaining flange 25 provided at the rear end.

A plurality of these units or devices of similar construction are adapted to be arranged in a series in a show-case, each unit being intended for displaying a different variety of candy, as indicated in Fig. 1 of the drawings, and although these units or devices have been disclosed as constructed of sheet metal and in a particular form, they may also be made of wood or of any other suitable material and the parts assembled in any approved form desired.

It is apparent from the foregoing disclosure that my improved construction provides a display space or chamber 26 between the side members 14 and the partition means 19, 19′; and that when these devices are placed in a show-case, as illustrated, the candy or goods may be placed between the side members and partition, and may extend to the inner sides of the glass plates 11 and 12 of the show-case, thereby providing a shallow display chamber which will make it appear to the buyer as though the entire unit were filled; and it also appears that the candy can be withdrawn from the inner or storage chamber 27 without disturbing the display, and will at the same time convey the appearance as though it were withdrawn from the display and from a full box, largely due to the flange 22 positioned forward of the rear ends of sides 14 and bottom flange 25. It is further apparent that any unit can be readily removed and cleansed, or the contents changed without disturbing any of the other units, also that the shallow layer of candy and goods will not exert much pressure on the glass to the show-case as is done when the candy is piled up high against said glass without the use of a display device. Such a series of units also provides a uniform and maximum display of each different kind of candy, regardless of the varying larger or smaller amounts of candy in the different units. It will further be observed that each display unit or container has an exterior display space between the overlapping side wall margins, which display space is laterally co-extensive with the storage space, both being defined by the vertical planes of the side wall margins; whereby, when the units are used individually, the supply within a given unit is represented by an exterior display corresponding thereto in character, area and vertical position, and when the units are arranged in contiguous series, inside a show-case or upon a counter, the several kinds of merchandise within the individual storage chambers of the series are represented by exterior segregated displays corresponding in character, area and vertical location to that within each unit.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A combination display device and container constructed of sheet metal having a pair of side walls and a bottom member fastened thereto, and being provided with upwardly extending retaining means, and partition means extending substantially parallel with and adjacent to the top and front of the side walls and forming a display chamber therewith, the rear end of said partition means being bent up to form a retaining flange positioned a distance forward of the rear of said device and of said bottom retaining means, in order to give the appearance of withdrawing the goods from the display chamber and from a full container.

2. A display device mountable in a show-case, side walls on said device substantially equal to the cross section of said case, a bottom member supported by the inwardly and upwardly bent lower edges of said side walls, and a partition clamped between the inturned flanges of said side walls and located adjacent the front and top of said case to form with said case and side walls a shallow chamber for displaying goods at the front and at the top of said case.

3. A series of separated, similar assembled units or devices mountable in a show-case, and each unit comprising containing means to form a storage chamber and means including a partition co-operating with the containing means and with the front and top of the show-case to form a display chamber for displaying goods at the front and at the top of the unit, each of said units or devices being removable independently with material in said storage chamber and without disturbing either the display contents or the storage contents of any other unit or device.

4. A series of separated and similar assembled devices mountable in a show-case, each device comprising side walls substantially equal to the cross section of said case to extend from the front to the back of said case, a continuous partition mounted between said side walls and extending along the front and the forward part of the top of said case to form with said case and side walls a shallow chamber to display goods, a bottom member extending the length of said side walls and with said side walls and partition forming a storage chamber for candy to be sold, the rear end of said partition being bent up to form retaining means positioned forwardly of the rear of said case and of the bottom member, and flanges along the front and top edges of the side walls projecting beyond said partition whereby each device is removable with the candy in the storage chamber without disturbing either the display contents or the storage contents of any of the other devices.

5. A series of separated and similar devices mountable in a showcase, each device comprising side walls substantially equal to the cross section of said case to extend from the front to the back of said case, a continuous partition mounted between said side walls and extending along the front and at least a part of the top of said case to form with said case and side walls a shallow chamber to display goods, a bottom member extending the length of said side walls and with said side walls and partition forming a storage chamber for candy to be sold, the rear end of said partition being bent up to form retaining means, and flanges along the front and top edges of the side walls projecting beyond said partition whereby each device is removable with the candy in the storage chamber without disturbing either the display contents or the storage contents of any of the other devices.

6. A display unit for mounting in a glazed show-case and including side walls substantially equal to the cross section of said case, a bottom member interlocked with the lower edges of said side walls, and a partition member interlocked at its edges with the upper edges of the side walls and with the forward edge of the bottom member at a distance below said upper edge and spaced from said forward edge whereby to afford display space between the said unit and the front and top of the show-case, said unit open at the rear end to afford access to the storage space therein.

7. A display unit adapted for mounting in a glazed show-case and of a length and height approximating the interior width and height of the show-case, the unit including front, top and side walls, the side walls overlapping and extending beyond the front and top walls to provide a shallow display space at the front and above said unit and the rear end of the unit affording access to an interior storage space.

8. A display unit having side and bottom walls and a partition means extending between said side walls, the said bottom wall being provided with an upstanding flange on the rear edge thereof, the said means extending from said bottom wall upwardly and rearwardly substantially parallel with and in spaced relation to the front and top edges of said side walls, and the rear edge of said means terminating short of the rear edges of said side and bottom walls and being provided with an upturned flange.

9. A show case having a plurality of similar display units arranged in series therein, each of said units being provided with means including a top and two side partitions, forming a storage space having an open rear end, and flanges projecting forwardly and upwardly from the front and top sides of each unit to form display containers.

10. A show case having a plurality of similar display units arranged in series therein, each of said units being provided with means including a top and two side partitions, forming a storage space having an open rear end, means associated with each unit for permitting the contents of any unit to be removed from said case without disturbing the contents of other units, and flanges projecting forwardly and upwardly from the front and top sides of each unit to form display containers.

In testimony whereof I have hereunto subscribed my name.

AURIOL M. STRYKER.